United States Patent Office 3,396,019
Patented Aug. 6, 1968

3,396,019
PLANOGRAPHIC PRINTING PLATES
Fritz Uhlig, Wiesbaden-Biebrich, Germany, assignor, by mesne assignments, to Azoplate Corporation, Murray Hill, N.J.
No Drawing. Continuation-in-part of application Ser. No. 124,804, July 18, 1961. This application Feb. 1, 1965, Ser. No. 429,625
Claims priority, application Germany, Aug. 5, 1960, K 41,387; Feb. 25, 1961, K 43,011
18 Claims. (Cl. 96—33)

ABSTRACT OF THE DISCLOSURE

This invention relates to a presensitized printing plate and process for developing same, the presensitized plate comprising a base of aluminum, a first layer thereon comprising an organic phosphonic acid or derivative thereof, and a second reproduction layer on the first layer, the latter comprising a mixture of at least one water-insoluble organophilic resin and a water-soluble diazonium condensate which is the product of a condensation of a diphenylamine-4-diazonium salt and formaldehyde in an acid condensation medium.

This application is a continuation-in-part of copending application Ser. No. 124,804, filed July 18, 1961, now U.S. Patent No. 3,220,832.

In copending application Ser. No. 124,804, filed July 18, 1961, there are disclosed plates for planographic printing wherein aluminum is used as a supporting material for a reproduction coating and is provided with a thin intermediate coating consisting of one or more phosphonic acids and/or derivatives thereof.

This invention relates to plates for planographic printing which are an improvement over those disclosed in the copending application, supra, and which contain, in the reproduction coating which is applied to a base material of aluminum, one or more resins and one or more diazonium condensates which are the products of a condensation of a diphenylamine-4-diazonium salt or a substituted diphenylamine-4-diazonium chloride with formaldehyde in an acid condensation medium, such as sulfuric acid, hydrochloric acid, hydrobromic acid or phosphoric acid.

Any of the phosphonic acids and/or derivatives thereof which are disclosed in the copending application may be used in the plates of the present invention to form the intermediate coating between the base material and the reproduction layer, and any of the radiation-sensitive sensitizers which are disclosed in the copending application may be employed in the printing plates of the present invention, provided they are condensation products of the just-mentioned type.

The resins which are added to the reproduction layer in the printing plates of the present invention are those which have one or more groups conferring alkali-solubility, such as an acid anhydride, a carboxylic acid, a sulfonic acid, a sulfonamide or a sulfonimide group and are, for example, vinyl polymers, vinyl interpolymers, phthalic acid ester resins, maleinate resins, alkyd resins, colophony resins or polyacrylic acid resins, as well as resins of the novolak type.

Other resins which are added to the reproduction layer are acetal resins, preferably polyvinyl acetals, such as polyvinyl formals and polyvinyl butyrals; phenol resins, such as phenol formaldehyde resins of the novolak type, preferably those of the novolaks which have softening points over 100° C.; oil modified alkyd resins; and epoxy resins.

Oil modified alkyd resins are well known and commercially available in various types. They are condensation products of polybasic acids and polyhydric alcohols, such as of o-phthalic acid and glycerol, with part of the hydroxyl groups of the polyhydric alcohol being esterified with a fatty acid of an oil.

Epoxy resins are condensation products which are polyethers having free hydroxyl groups. For example, they contain as structural units condensation products of 2,2-bis-(4-hydroxyphenyl)-propane and epichlorohydrin; they are glycidyl ethers of 2,2-bis-(4-hydroxyphenyl)-propane in which one of the hydroxyl groups of the glycidyl group is not consumed in the condensation; this hydroxyl group is available for etherification or esterification with other groups such as by a reaction with a fatty acid or an oil. Other modifications are also applicable, such as with precondensates of amino resins, with phenol resins, with polyamides, or with polyvinyl resins. The epoxy resins are formed, when using them, while starting with soluble precondensation products which are hardening, e.g., in the presence of hardening components or of catalysts, by the application of heat; in as much as they are modified with unsaturated fatty acids, they may also be air-hardening. More detailed descriptions of epoxy resins may be found, e.g., in the first supplemental volume of the "Encyclopedia of Chemical Technology," edited by Kirk and Othmer, published by The Interscience Encyclopedia Inc., New York, 1957, on pages 312 to 329, and in the book "Epoxydverbindungen und Epoxydharze," edited by Paquin, published by Springer-Verlag, Berlin, Gottingen und Heidelberg, 1958, especially on pages 340 to 528. Epoxy resins are commercially available.

Other resins may be present in the reproduction layer, such as polyamide resins, polyisocyanate resins, alkyd resins other than oil-modified alkyd resins, or amine-formaldehyde resins, such as urea-formaldehyde or melamine-formaldehyde resins. More than one representant of a type of resins or representants of more than one type of resins may be present in the reproduction layer.

For example, planographic printing plates according to the invention, the reproduction layer of which contains amine-formaldehyde resins in addition to oil-modified alkyd resins, have shown to be of advantage. In this combination of resins, a percentage by weight of amine-formaldehyde is preferred which is not in excess of three times the percentage of oil-modified alkyd resin, the sum of the percentages of amine-formaldehyde resins and oil-modified alkyd resins being at least 50% of the sum of all of the resins present in the reproduction layer.

The amount of resins present in the layer may vary within wide limits, the lower limit being about 0.1 part by weight for each part by weight of diazonium condensation product, the upper limit being about 10 parts by weight for each part by weight of diazonium compounds. In most cases, phenol resins and acetal resins excepted, it is not advisable, however, to enhance the amount of resins over 5 parts by weight for each part of diazonium condensate. An amount of resins within the limits of 0.5 part to 2.0 parts by weight per each part by weight of diazonium condensation product is preferred, although even more parts by weight of resins, such as 3 parts by weight of phenolic resin or acetal resin are applicable with satisfactory advantage in the invention.

The resin or resins are added to a solution containing the sensitizer, i.e., a diphenylamine-4-diazonium salt/formaldehyde condensation product, the solution is coated on the pretreated aluminum base, and the solvent is then removed, leaving a thin, homogeneous, uniform coating of the resin and the sensitizer on the pretreated base material, the pretreatment being effected, as noted above, with one or more phosphonic acids and/or derivatives thereof.

The light sensitive reproduction layers of the materials of the present invention may, but must not, have incorporated therein additions which are known in the art of making presensitized planographic printing plates, and which additions may sustain the hydrophobic character of the reproduction layer, or make it easier to use the presensitized material, or increase the number of prints obtainable from a printing plate made from the presensitized material. Such additions may be, e.g., plastizers, dyestuffs, fatty acids, or colloids. They shall be present in the reproduction layer in relatively small amounts only, which means that the additives should not be in excess of 20 percent by weight of the weight of all resins present.

The addition of one or more resins to the reproduction layers of the planographic printing plates of the present invention results in plates which give considerably longer runs on the press and the presensitized plates of the present invention exhibit improved shelf life compared to those hitherto known, especially under conditions of high temperature and humidity. In addition, those of the planographic printing plates according to the present invention whose reproduction layers comprise oil-modified alkyd resins or epoxy resins, are less sensitive to touching with bare fingers than other presensitized planographic printing plates. Further, the presence of epoxy resins in the reproduction layer renders the printing plates highly resistant to dilute acids, which is of importance inasmuch as the damping solutions which are applied in the use of planographic printing plates usually contain some acid.

The invention will be further illustrated by reference to the following specific examples:

EXAMPLE 1

A mechanically roughened aluminum foil is immersed for 50 seconds at 30° C. in a solution in water or 0.8 percent of polyvinyl phosphonic acid and 0.2 percent of vinyl phosphonic acid. After the aluminum foil has been rinsed with water and dried, the foil is coated with a light-sensitive solution containing 1.25 parts by weight of a crude condensate of paraformaldehyde and diphenylamine-4-diazonium chloride described in detail below, 0.75 part by weight of an interpolymer containing carboxyl groups (85 percent vinyl chloride, 14 percent vinyl acetate, 1 percent maleic acid), 8 parts by weight of water, 80 parts by weight of glycol monomethyl ether, and 20 parts by weight of dimethyl formamide. The coated aluminum foil is dried and heated for a further two minutes to 100° C. The light sensitive coating, which has very good keeping qualities in the unexposed state, is exposed with a photographic negative, e.g., for 40 seconds to an 18-amp arc lamp at a distance of 70 cm. The exposed coating is developed with an aqueous solution containing 8 percent of gum arabic by means of a pad and is then inked up with greasy ink. The plate is then ready for printing. The image on the printing plate may also be strengthened with lacquer in known manner. Alternatively, development and lacquering can be effected simultaneously by means of an aqueous emulsion lacquer. The resulting printing plate is extraordinarily resistant to rubbing with phosphoric acid and with the phosphoric acid anti-scumming agents commonly used in printing machines.

The support used can also be an aluminum foil covered with a layer of böhmite (as described in my copending application Ser. No. 78,300, filed Dec. 27, 1960), an electrolytically roughened aluminum foil, or a foil of virgin aluminum sheet. The results obtained are just as good as those obtained with the mechanically roughened alumina foil.

The crude condensate from paraformaldehyde and diphenyl-4-diazonium chloride is prepared as follows:

3.3 parts by weight of paraformaldehyde and 23 parts by weight of diphenylamine-4-diazonium chloride are stirred at room temperature into 42 parts by weight of 85 percent phosphoric acid. A viscous solution is formed which is further stirred for half an hour at room temperature and then heated to 40° C. This temperature is maintained for a further 24 hours and the reaction is then completed. If desired, the phosophoric acid can be replaced by the same quantity of pyrophosphoric acid or metaphosphoric acid.

The condensation product—a thick, homogeneous mixture—has excellent keeping qualities which even allow it to be consigned for transport. It can be mixed with water and with many organic solvents, e.g., methanol or other aliphatic alcohols, dioxane, ethylene glycol monomethyl ether, and dimethyl formamide. Thus, it is possible for the coating solution to be adapted so far as concerns the solvent to the material which is to be coated. The condensation product may also be used in admixture with water-soluble additive or with additives which are not soluble in water but are soluble in organic solvents. For many purposes the viscous reaction product can be used direct and without isolation which is very advantageous.

In the same manner, and with equally good results, one of the following compounds may be used instead of the diphenylamine-4-diazonium chloride for the condensation with formaldehyde in phosphoric acid:

3-methoxy-diphenylamine-4-diazonium chloride,
2-methoxy-diphenylamine-4-diazonium chloride,
3-methyl-diphenylamine-4-diazonium chloride,
4'-methoxy-diphenylamine-4-diazonium chloride,
3-ethoxy-diphenylamine-4-diazonium chloride.

The condensation products are prepared in anaolgy to the preparation of the unsubstituted condensate described above.

EXAMPLE 2

A solution, in ethylene glycol monomethyl ether, of 2 parts by weight of Formvar 12/85 (a polyvinyl formal manufactured by Shawinigan Resins, having a molecular weight of 30,000; hydroxyl content (as percent polyvinyl alcohol) 5 to 7; acetate content (as percent polyvinyl acetate) 20 to 27; specific gravity: 1.2; viscosity, in centipoises (determined with 5 grams of resin made to 100 ml. with ethylene chloride at 20° C.): 18–22), and one part by weight of a condensation product of para-diazo-diphenylamine chloride and formaldehyde condensed in phosphoric acid, in accordance with the procedure of copending application Ser. No. 150,211, filed Nov. 6, 1961, was applied to an aluminum carrier the surface of which had been pretreated with polyvinyl phosphonic acid by immersion for 60 seconds at 20° C. in a bath of 0.01 percent polyvinyl phosphonic acid in solution in pure water. The coating was dried for one minute at a temperature of 100° C., and then exposed to light under a negative master. The plate was developed by treatment with water and a number of flawless copies were obtained from the plate when it was clamped into an offset printing press.

EXAMPLE 3

A solution, in ethylene glycole monomethyl ether, of 1.25 parts by weight of a novolak resin, marketed under the trade name Alnovol 429K, by Chemische Werke Albert of Wiesbaden-Biebrich, Germany, and 2 parts by weight of a condensation product of para-diazodiphenylamine chloride and formaldehyde, condensed in phosphoric acid, used in Example 2 above, was applied to an aluminum sheet the surface of which was pretreated with polyvinyl phosphonic acid in accordance with the procedure of Example 2 above, after which the coating was dried. The thus formed presensitized plate was exposed to ultraviolet light for several minutes under a negative master and the light-exposed plate was then developed with water. A series of flawless copies was obtained when the plate was run on a printing press.

EXAMPLE 4

A solution, in ethylene glycol monomethyl ether, of 0.8 part by weight of polyvinyl butyral resin (marketed under the trade name Mowital B30T by Farbwerke Hoechst A.G., a corporation of Germany, the compound having an average molecular weight in the range of about 60,000 to 70,000, an acetal content of 69 to 71 percent by weight, an acetate content of about 1 percent by weight, an alcohol content of 24 to 27 percent by weight and a viscosity in the range of 20 to 30 centipoises at 20° C. (5 percent solution in butyl alcohol)), 1 part by weight of a phenol-formaldehyde resin novolak (marketed under the trade name of Alnovol 429K by Chemische Werke Albert of Wiesbaden-Biebrich, Germany), and 0.4 part by weight of a condensation product of p-diazodiphenylamine chloride and formaldehyde, condensed in phosphoric acid in accordance with the procedure of copending application Ser. No. 150,211, filed Nov. 6, 1961, was coated onto an aluminum carrier the surface of which had been pretreated with polyvinyl phosphonic acid according to the procedure of Example 2 above. The coating was then dried for two minutes at a temperature of 100° C., exposed to light under a negative master, and developed with a solution consisting of 70 parts by weight of isopropanol and 30 parts by weight of water.

When the resulting plate was run on a printing press, multiple flawless copies, true to the original, were obtained.

EXAMPLE 5

A solution in ethylene glycol monomethyl ether of 0.8 part by weight of a polyvinyl butyral resin (marketed under the trade name Mowital B30H, by Farkwerke Hoechst A.G., a corporation of Germany, the compound having an average molecular weight in the range of about 60,000 to 70,000, an acetal content of 75 to 77 percent by weight, an acetate content of about 1 percent by weight, an alcohol content of 18 to 21 percent by weight, and a viscosity in the range of 20 to 30 centipoises at 20° C. (5 percent solution in butyl alcohol)), 1 part by weight of a phenol-formaldehyde resin novolak (marketed under the trade name of Alnovol 429K by Chemische Werke Albert, Wiesbaden-Biebrich, Germany), 0.5 part by weight of an epoxy resin (marketed by Shell Chemical Corporation under the name Epon resin 1004, the resin having an epoxide equivalent (grams of resin containing 1 equivalent of epoxide) of 905 to 985, a viscosity of 4.7 to 5.5 poises for a 40 percent solution in butyl Carbitol and a melting point (Durran's mercury method) of 97 to 103° C.), and 0.4 part by weight of a condensation product of p-diazodiphenylamine chloride and formaldehyde, condensed in phosphoric acid in accordance with the procedure of copending application Serial No. 150,211, filed Nov. 6, 1961, was coated onto an aluminum carrier pretreated with polyvinyl phosphonic acid according to the procedure of Example 2 above. The coating was dried for several minutes at a temperature of 80° C., exposed to light under a negative master and developed with a solution consisting of 70 parts by weight of isopropanol and 30 parts by weight of water.

When this plate was run on a printing press, a series of flawless copies were obtained.

EXAMPLE 6

An aluminum foil mechanically roughened and provided with a böhmite coating, prepared according to the procedure of copending application Ser. No. 78,300, filed Dec. 27, 1960, was immersed for a period of 10 seconds at a temperature of 70° C. in an aqueous bath of 0.5 percent by weight of polyvinyl phosphonic acid and dried. The foil was then coated with a light-sensitive solution containing the following constituents: 0.4 part by weight of a polycondensate (prepared as described in detail below), 0.25 part by weight of a polyvinyl butyral (molecular weight approximately 60,000 to 70,000, acetal content 69 to 71 percent, acetate content 1 percent, alcohol content 25 to 27 percent, viscosity 20 to 30 centipoises at 20° C.), 5 parts by weight of water and 95 parts by weight of methylene glycol.

The polycondensate is prepared as follows:

3.3 parts by weight of paraformaldehyde and 23 parts by weight of diphenylamine-4-diazonium chloride are stirred at room temperature into 42 parts by weight of 85 percent phosphoric acid. A viscous solution is formed which is further stirred for half an hour at room temperature and then heated to 40° C. This temperature is maintained for a further 24 hours and the reaction is then completed. If desired, the phosphoric acid can be replaced by the same quantity of pyrophosphoric acid or metaphosphoric acid.

The coated aluminum foil was then dried and it was found that it could be stored in the dark for many months without deterioration. To prepare a printing plate, the light-sensitive coating is exposed with a photographic negative, e.g., for 40 seconds to an 18-amp arc lamp at a distance of 70 cm. The exposed coating is developed with an aqueous solution containing 8 percent of gum arabic, by means of a pad and is then inked up with greasy ink. The plate is then ready for printing. The image on the printing plate may also be strengthened with lacquer in known manner. Alternatively, development and lacquering can be effected simultaneously by means of an aqueous emulsion lacquer. The resulting printing plate is extraordinarily resistant to rubbing with phosphoric acid and with the phosphoric acid antiscumming agents commonly used in printing machines.

In the same manner, and with equally good results, any of the following compounds may be used instead of the diphenylamine-4-diazonium chloride for the condensation with formaldehyde in phosphoric acid:

2-methoxy-diphenylamine-4-diazonium chloride,
2-methoxy-diphenylamine-4-diazonium chloride,
3-methyl-diphenylamine-4-diazonium chloride,
4'-methoxy-diphenylamine-4-diazonium chloride,
3-ethoxy-diphenylamine-4-diazonium chloride.

The condensation products are prepared in a manner analogous to the preparation of the unsubstituted condensate described above.

EXAMPLE 7

The procedure of Example 6 was repeated with the exception that a sensitizing solution consisting of the following constituents was employed: 1 part by weight of a condensation product prepared from diphenylamine-4-diazonium phosphate and formaldehyde in phosphoric acid and precipitated in the form of an acid phosphate, 2 parts by weight of a polyvinyl formal (molecular weight 30,000, hydroxyl group content 7 percent, acetate content 20 to 27 percent, viscosity 18 to 22 centipoises at 20° C.), 10 parts by weight of water, and 87 parts by weight of ethylene glycol.

EXAMPLE 8

A grained aluminum web was passed through a bath containing an aqueous solution of 0.1 percent by weight of a copolymer of vinyl phosphonic acid and acrylic acid (ratio 6:4) and was then dried and coated with a light-sensitive solution containing 0.3 part by weight of a condensation product described in detail below and 0.8 part by weight of a novolak dissolved in ethylene glycol monomethyl ether.

The condensation producet used in the light-sensitive solution is prepared as follows:

Over a period of 15 minutes, 20 parts by weight of 4'-methyl-diphenylamine-4-diazonium sulfate are introduced into a solution of 1.96 parts by weight of paraformaldehyde in 42 parts by volume of 78 percent sulfuric acid. The condensation mixture is agitated, first for one hour at room temperature and then for 90 minutes at a temperature of 40° C., and is then left standing overnight at room temperature. Subsequently, it is diluted with 150 parts by volume of water and a saturated barium chloride solution is added until neither an excess of barium nor sulfate ions can be detected. After removal of the barium sulfate, the solution is evaporated to dryness under vacuum at a temperature up to 60° C.

EXAMPLE 9

A sheet of aluminum was immersed for one minute at a temperature of 80° C. in an aqueous solution of 1 percent by weight of polyvinyl phosphonic acid and 0.2 percent by weight of vinyl phosphonic acid. After drying, a light-sensitive coating was applied from a solution containing the following constituents: 0.4 part by weight of the polycondensate described in Example 6 above, 0.8 part by weight of polyvinyl butyral (molecular weight 60,000 to 70,000, acetal content 75 to 77 percent, acetate content 1 percent, alcohol content 18 to 21 percent, viscosity 20 to 30 centipoises at 20° C.), 1 part by weight of a novolak having a softening range of 105 to 110° C., 7.8 parts by weight of butyl acetate, 10 parts by weight of xylol, and 80 parts by weight of cellosolve acetate.

A printing plate was prepared from the coated foil in accordance with the procedure of Example 6 above.

EXAMPLE 10

An aluminum plate of 0.1 mm. thickness which had been mechanically roughened by brushing and then provided with a böhmite layer by immersing for ten minutes in a 2 percent ammonia solution of 80° C., was immersed for 2 seconds in a bath of 70° C. containing 0.5 percent by weight of polyvinyl phosphonic acid in water, and dried. The thus pretreated surface of the aluminum plate was then coated with a solution containing the following components:

0.4 part by weight of the condensation product of 23 parts by weight of diphenyl-4-diazonium chloride, 3.3 parts by weight of formaldehyde, and 42.0 parts by weight of 85 percent phosphoric acid, used in the form of the crude condensate, i.e., without separating from the phosphoric acid (see Example 1 of German patent specification No. 1,160,733),
0.13 part by weight of a nonplasticized colorless urea resin having an acid number of approximately 2 (the product used was the resin marketed by the Chemische Werke Albert, Weisbaden-Biebrich, Germany, under the trademark "Resamine 106F"),
0.13 part by weight of a ricinene-oil modified alkyd resin having an acid content of 40 percent by weight, calculated as the phthalic acid anhydride, an oil content of 30 percent by weight, calculated as ricinene oil, and an acid number below 10 (the product used was the resin marketed by Chemische Werke Albert, Wiesbaden-Biebrich, Germany, under the trademark "Alftalat 814B"),
5.0 parts by weight of water, and
95.0 parts by weight of ethylene glycol monomethyl ether.

The coated aluminum foil was dried and could then be stored for many months in the dark without losing any of its light sensitivity or the adhesion between the reproduction layer and the support.

For the preparation of a printing plate the presensitized plate thus obtained was exposed for 40 seconds under a photographic negative, using a 60-amp arc lamp at a distance of 70 cm. The exposed layer was developed by swabbing with an aqueous solution containing 8 percent by weight of gum arabic and then inked up with greasy ink. The plate was then ready for printing.

Analogously, presensitized printing plates were prepared in which the aluminum supports were coated with solutions which contained, as the light sensitive substances, not the condensation product of diphenyl-4-diazonium chloride, but condensation products of formaldehyde with one of the following diazonium salts:

3-methoxy-diphenylamine-4-diazonium chloride,
2-methoxy-diphenylamine-4-diazonium chloride,
3-methyl-diphenylamine-4-diazonium chloride,
4'-methoxy-diphenylamine-4-diazonium chloride,
3-ethoxy-diphenylamine-4-diazonium chloride.

In each case, printing plates were obtained which were of excellent quality, in particular as regards the length of run obtainable therefrom and insensitivity to finger prints.

EXAMPLE 11

The procedure described in Example 10 is repeated using, however, as the resin mixture a mixture of 0.2 part by weight of a melamine resin having an acid number lower than 1 ("Resamine 882" of Monsanto Chemical Industries, U.S.A., was used), and
0.1 part by weight of a ricinene-oil modified alkyd resin having an oil content of 32 percent by weight ("Alkydal R35," a product of Farbenfabriken Bayer, Leverkusen, Germany).

EXAMPLE 12

The procedure described in Example 10 was repeated, using as the resin component 0.3 part by weight of a ricinene-oil modified alkyd resin having an acid content of 40 percent by weight, calculated as phthalic acid anhydride, an oil content of 30 percent by weight, calculated as ricinene oil, and an acid number lower than 10 (the resin used was the product sold by Chemische Werke Albert, Wiesbaden-Biebrich, Germany, under the trade mark "Alftalat 814B").

EXAMPLES 13 to 19

The procedure described in Example 12 was repeated, using, however, instead of the oil-modified alkyd resin stated in Example 12, one of the following oil-modified alkyd resins:

| Example | Modifying Oil | Content of Phthalic Acid Anhydride (percent by weight) | Oil Content (percent by weight) | Trade Name |
| --- | --- | --- | --- | --- |
| 13 | Ricinene oil | 36 | 42 | Alftalat 858B. |
| 14 | Linseed and soy oil | 30 | 50 | Alftalat 836B. |
| 15 | Soy oil | 20 | 68 | Alftalat 597B. |
| 16 | do | 31 | 56 | Alftalat 595B. |
| 17 | Ricinene and coconut oil | 35 | 37 | Alftalat 522S. |
| 18 | Castor oil | | 35 | Glyptal O21. |
| 19 | do | 27 | 52 | Alkydal W. |

Good results were also obtained by using equal parts by weight of the oil-modified alkyl resins marketed under the trademarks "Epok A," Sylac 123X," and "Heso-Alkyd 30R."

EXAMPLE 20

An aluminum plate of 0.1 mm. thickness was mechanically roughened by brushing and then provided with a böhmite layer by immersing it for 10 minutes into a 2 percent solution of ammonia of a temperature of 80° C. Subsequently, the plate was immersed for 10 seconds into a bath having a temperature of 70° C. and containing 0.5 percent by weight of polyvinyl phosphonic acid dissolved in water, and then dried. The surface of the aluminum plate pretreated in this manner was then coated by applying a solution of the following composition:

0.4 part by weight of the condensate of 3.3 parts by weight of paraformaldehyde and 23 parts by weight of diphenylamine-4-diazonium chloride in 42 parts by weight of 85 percent phosphoric acid, used in the form of the crude condensate, i.e., without separation from the phosphoric acid, 0.8 part by weight of an epoxy resin having a melting point of 70° C., a weight per epoxy equivalent of about 500, and a hydroxyl value of about 0.3 (the product used was the resin sold by Shell under the trademark "Epikote 1001"), 5.0 parts by weight of water, and 95 parts by weight of ethylglycol monomethyl ether.

The coated aluminum foil was dried and had an excellent shelf life. It could be stored in the dark for many months without its light sensitivity or the length of run obtainable therefrom being diminished.

For the preparation of a printing plate, the presensitized plate was exposed for 40 seconds under a photographic negative, using a 60-amp arc lamp at a distance of 70 cm. The exposed layer was developed by swabbing with an aqueous solution containing 8 percent of gum arabic and then inked up with greasy ink. Thereafter, the plate was ready for printing.

Further, presensitized printing plates were prepared and converted into printing plates in an analogous manner. In these printing plates, the condensation product of diphenylamine-4-diazonium chloride and formaldehyde used in the present example was replaced by condensation products of formaldehyde with one of the following diazonium salts:

3-methoxy-diphenylamine-4-diazonium chloride,
2-methoxy-diphenylamine-4-diazonium chloride,
3-methyl-diphenylamine-4-diazonium chloride,
4'-methoxy-diphenylamine-4-diazonium chloride,
3-ethoxy-diphenylamine-4-diazonium chloride.

Printing plates were obtained in each case which had very good qualities, in particular as regards the length of runs obtainable therefrom and insensitivity to finger prints.

EXAMPLE 21

The procedure described in Example 20 was repeated, using a sensitizing solution of the following composition:

1 part by weight of a condensation product of 50 parts by weight of diphenylamine-4-diazonium phosphate, 5.63 parts by weight of paraformaldehyde, and 42.6 parts by weight of 85 percent phosphoric acid, separated in the form of the acid phosphate (see Example 5 of German patent specification 1,160,733), 1 part by weight of an epoxy resin having a melting point of approx. 100° C., a weight per epoxy equivalent of about 1000, and a hydroxyl value of about 0.35 (the product used was the resin sold by Shell under the trademark "Epikote 1004"), 0.04 part by weight of ethylene diamine, 5.0 parts by weight of water, and 93.0 parts by weight of ethylene glycol monoethyl ether.

EXAMPLE 22

A strip of mechanically roughened aluminum was passed through a bath containing a solution of 0.1 percent by weight of a copolymer of 6 parts by weight of vinylphosphonic acid and 4 parts by weight of acrylic acid dissolved in water. After drying, the strip was coated with a light sensitive solution of the following composition:

0.4 part by weight of the chloride of a condensation product of 1.96 parts by weight of paraformaldehyde and 20 parts by weight of 4-methyl-diphenylamine-4-diazonium sulfate in 42 parts by volume of 78 percent sulfuric acid (see Example 9 of German patent specification No. 1,160,733), 0.4 part by weight of an epoxy resin having a melting point of approximately 150° C., a weight per epoxy equivalent of about 2000 to 4000, and a hydroxyl value of about 0.4 (the product used was the resin sold by Shell under the trademark "Epikote 1009"), 0.1 part by weight of a polyisocyanate, viz., a reaction product of a mixture of 2,4-toluylene-diisocyanate and 2,6-toluylene-diisocyanate with 1,1,1-trihydroxymethylpropane and similar polyalcohols, in which reaction the diisocyanates are applied in such excess that about one toluylene-diisocyanate molecule is present per alcoholic hydroxyl group and that one of each two isocyanate groups remains reactive (the polyisocyanate used was a product marketed by Farbenfabriken Bayer, Leverkusen, Germany, under the trademark "Desmodur L"), 60.0 parts by weight of ethylglycol monomethyl ether, and 40.0 parts by weight of methyl ethyl ketone.

EXAMPLE 23

A foil of smooth rolled aluminum was immersed for one minute into a bath of 80° C. containing 1 percent by weight of polyvinyl phosphonic acid and 0.2 percent by weight of vinyl phosphonic acid in water.

After being dried, the foil was coated with a light sensitive solution having the following composition:

0.8 part by weight of the light sensitive condensation product used in Example 20, 0.3 part by weight of the epoxy resin used in Example 20, 0.15 part by weight of a nonplasticized, colorless urea resin having an acid number of about 2 (the resin used was the product sold by Chemische Werke Albert, Wiesbaden-Biebrich, Germany, under the trademark "Resamine 106F"), 5.0 parts by weight of water, 8.0 parts by weight of butyl acetate, 10.0 parts by weight of xylene, and 80.0 parts by weight of ethylene glycol acetate ethyl ether.

For the preparation of a printing plate, the foil was exposed under a negative and then wiped over with a cotton pad soaked in an aqueous solution containing 8 percent by weight of gum arabic, 3 percent by weight of magnesium nitrate, and 1 percent by weight of 85 percent phosphoric acid.

EXAMPLE 24

The procedure described in Example 20 was repeated, using a sensitizing solution of the following composition:

1.0 part by weight of the condensate of the diazonium salt mentioned in Example 22, 0.4 part by weight of the epoxy resin mentioned in Example 20, 0.1 part by weight of a polyester prepared from adipic acid, phthalic acid and butane triol and having an acid number below 4, a hydroxyl content of about 8.8 percent by weight, and a viscosity at 20° C. of between 2200 and 3800 centipoises (the product used was the polyester marketed by Farben-fabriken Bayer, Leverkusen, Germany, under the trademark "Desmophen 800"), 80.0 parts by weight of methyl glycol monomethyl ether, and 18.0 parts by weight of butyl acetate.

EXAMPLE 25

The procedure described in Example 20 was repeated, using a sensitizing solution of the following composition:

0.6 part by weight of the diazonium salt condensate used in Example 20,
0.4 part by weight of an epoxy resin having a melting range from 113 to 123° C. (the product used was the resin sold by the Swiss firm Ciba under the trademark "Araldite 7097"),
0.1 part by weight of a nonhardenable phenol resin of the novolak-type having a melting range of from 108 to 118° C. (the product used was the resin sold by Chemische Werke Albert, Wiesbaden-Biebrich, Germany, under the trademark "Alnovol 429K"),
100.0 parts by weight of ethylene glycol nonoethyl ether.

EXAMPLE 26

The procedure described in Example 20 was repeated, using a sensitizing solution which contained, instead of 0.8 part of the epoxy resin mentioned in Example 20, two resins, viz., 0.1 part by weight of an epoxy-modified, thermosetting synthetic resin of the polyester type having an acid number below 15 (the product used was the resin marketed by Chemische Werke Albert, Wiesbaden-Biebrich, Germany, under the trademark "Duroxyn 570W") and 0.05 part by weight of a nonplasticized melamine resin having an acid number below 1 (the product used was "Resamine 106F" mentioned above).

EXAMPLE 27

The procedure described in Example 20 was repeated, using a sensitizing solution which contained, instead of 0.8 part by weight of the epoxy resin mentioned in Example 20, 0.3 part by weight of another epoxy resin, a product of Dow Chemical, U.S.A., commercially available under the trademark "DER 661."

EXAMPLE 28

The procedure described in Example 22 was repeated, using a sensitizing solution of the following composition:

0.4 part by weight of the diazonium salt condensation product used in Example 22,
0.32 part by weight of an oven-dried epoxy ester resin having an acid number below 5 and a content of tall oleic acid of about 40 percent (the product used was the resin sold by Reichhold Chemie AG., Hamburg, Germany, under the trademark "Beckosol P 787"),
0.08 part by weight of a melamine resin having a viscosity, at 20° C., of 50 to 70 DIN-sec. (the product used was the resin sold by Reichhold Chemie AG., Hamburg, Germany, under the trademark "Super-Beckamin 852"),
80.0 parts by weight of ethylene glycol monomethyl ether, and
20.0 parts by weight of butyl acetate.

EXAMPLE 29

A strip of mechanically roughened aluminum was passed through a bath containing a solution of 0.1 percent by weight of a copolymer of 6 parts by weight of vinyl phosphonic acid and 4 parts by weight of acrylic acid in water. The strip was dried and then coated with a light sensitive solution of the following composition:

0.4 part by weight of the chloride of a condensation product of 1.96 parts by weight of paraformaldehyde and 20 parts by weight of 4-methyl-diphenylamine-4-diazonium sulfate in 42 parts by volume of 78 percent sulfuric acid (see Example 9 of German patent specification No. 1,160,733),
0.2 part by weight of an oven-dried epoxy ester resin having an acid number below 5 and a content of tall oleic acid of about 40 percent by weight (the product used was the resin sold by Reichhold Chemie AG., Hamburg, Germany, under the trademark "Super-Beckamin 852"),
80.0 parts by weight of ethylene glycol monomethyl ether, and
20.0 parts by weight of butyl acetate.

EXAMPLE 30

The procedure described in Example 20 was repeated, using a sensitizing solution which contained, in addition to the components stated in Example 20, 0.8 part by weight of a polyamide resin containing reactive amino groups. (The product used was the resin sold by the firm Schering under the trademark "Versamid 100".

It will be obvious to those skilled in the art that many modifications may be within the scope of the present invention without departing from the spirit thereof, and the invention includes all such modifications.

What is claimed is:

1. A presensitized printing plate comprising a base of aluminum, a first layer thereon comprising at least one compound selected from the group consisting of an organic phosphonic acid and esters and salts thereof, and a second reproduction layer on the first layer, the latter comprising a mixture of at least one water-insoluble organophilic resin and a water-soluble diazonium condensate which is the product of a condensation of a diazonium salt selected from the group consisting of diphenylamine-4-diazonium salts and substituted diphenylamine-4-diazonium salts, and formaldehyde in an acid condensation medium.

2. A presensitized printing plate according to claim 1 in which the resin is an interpolymer of vinyl chloride, vinyl acetate, and maleic acid.

3. A presensitized printing plate according to claim 1 in which the resin is a polyvinyl formal.

4. A presensitized printing plate according to claim 1 in which the resin is a polyvinyl butyral.

5. A presensitized printing plate according to claim 1 in which the resin is a novolak.

6. A presensitized printing plate according to claim 1 in which the resin is an oil-modified alkyd resin.

7. A presensitized printing plate according to claim 1 in which the resin is an epoxy resin.

8. A presensitized printing plate according to claim 1 in which the diazonium condensate is the product of a condensation performed in phosphoric acid, and the second layer also comprises a phosphoric acid condensation medium.

9. A presensitized printing plate according to claim 1 in which the second layer also comprises free phosphoric acid.

10. A process for developing a printing plate which comprises exposing a coated aluminum base material to radiation under a master, the coating comprising a first layer comprising at least one compound selected from the group consisting of an organic phosphonic acid and esters and salts thereof, and a second reproduction layer on the first layer, the reproduction layer comprising a mixture of at least one water-insoluble organophilic resin and a water-soluble diazonium condensate which is the product of a condensation of a diazonium salt selected from the group consisting of diphenylamine-4-diazonium salts and substituted diphenylamine-4-diazonium salts, and formaldehyde in an acid condensation medium, and developing the resulting image with water whereby the coating is removed from the base material in the image-free areas thereof.

11. A process according to claim 10 in which the resin is an interpolymer of vinyl chloride, vinyl acetate, and maleic acid.

12. A process according to claim 10 in which the resin is a polyvinyl formal.

13. A process according to claim 10 in which the resin is a polyvinyl butyral.

14. A process according to claim 10 in which the resin is a novolak.

15. A process according to claim 10 in which the resin is an oil-modified alkyd resin.

16. A process according to claim 10 in which the resin is an epoxy resin.

17. A process according to claim 10 in which the diazonium condensate is the product of a condensation performed in phosphoric acid, and the second layer also comprises a phosphoric acid condensation medium.

18. A process according to claim 10 in which the second layer also comprises free phosphoric acid.

References Cited
UNITED STATES PATENTS

| | | | |
|---|---|---|---|
| 3,136,636 | 6/1964 | Dowdall et al. | 96—33 X |
| 3,179,518 | 4/1965 | Sus et al. | 96—33 |
| 3,219,447 | 11/1965 | Neugebauer et al. | 96—33 |
| 3,264,104 | 8/1966 | Reichel | 96—33 |

NORMAN G. TORCHIN, *Primary Examiner.*

R. E. MARTIN, *Assistant Examiner.*